(12) United States Patent
Li et al.

(10) Patent No.: US 9,641,468 B2
(45) Date of Patent: May 2, 2017

(54) METHOD, SERVER, CLIENT, AND SYSTEM FOR RELEASING INSTANT MESSAGING KEY-VALUE DATA

(71) Applicant: TENCENT TECHNOLOGY (SHENZHEN) COMPANY LIMITED, Shenzhen (CN)

(72) Inventors: Yanguo Li, Shenzhen (CN); Nianbo Liao, Shenzhen (CN); Guolin Chen, Shenzhen (CN); Xing Shu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 256 days.

(21) Appl. No.: 14/690,550

(22) Filed: Apr. 20, 2015

(65) Prior Publication Data
US 2015/0229590 A1   Aug. 13, 2015

Related U.S. Application Data

(63) Continuation of application No. PCT/CN2014/082695, filed on Jul. 22, 2014.

(30) Foreign Application Priority Data

Jul. 25, 2013  (CN) .......................... 2013 1 0316622

(51) Int. Cl.
*G06F 15/16*   (2006.01)
*H04L 12/58*   (2006.01)
(Continued)

(52) U.S. Cl.
CPC ................ *H04L 51/04* (2013.01); *G06F 9/00* (2013.01); *G06F 15/16* (2013.01);
(Continued)

(58) Field of Classification Search
CPC ......... H04L 51/36; H04L 51/04; H04L 67/42; H04L 51/14; H04L 51/24; H04L 51/32;
(Continued)

(56) References Cited

U.S. PATENT DOCUMENTS 8,468,196 B1    6/2013 Roskind et al.
2003/0028577 A1*  2/2003 Dorland ................ G06F 9/542
                                                    718/100

(Continued)

FOREIGN PATENT DOCUMENTS

| CN | 101719904 A | 6/2010 |
| CN | 102820975 A | 12/2012 |
| CN | 103078899 A | 5/2013 |

OTHER PUBLICATIONS

The World Intellectual Property Organization (WIPO) International Search Report for PCT/CN2014/082695 Oct. 27, 2014.

*Primary Examiner* — Chris Parry
*Assistant Examiner* — Weiwei Stiltner
(74) *Attorney, Agent, or Firm* — Anova Law Group, PLLC

(57) ABSTRACT

Methods, servers, clients, and systems for releasing instant messaging key-value data are provided. A server receives a request packet for pulling key-value data sent from a client during a login. The request packet at least contains a full-amount pulling time-stamp, an increased-amount pulling time-stamp, and a data-altering serial number. The server selects a pre-set data releasing mechanism according to parameters contained in the request packet, to release full amount key-value data to the client or to release increased amount key-value data to the client, or not to release the key-value data, such that, according to a returned result from the server, the client updates local cache data to display to a user.

16 Claims, 6 Drawing Sheets

(51) Int. Cl.
*H04L 29/08* (2006.01)
*G06F 9/00* (2006.01)
*H04L 29/06* (2006.01)
*G06F 17/30* (2006.01)

(52) U.S. Cl.
CPC .. *G06F 17/30551* (2013.01); *G06F 17/30876* (2013.01); *H04L 12/581* (2013.01); *H04L 12/5825* (2013.01); *H04L 51/12* (2013.01); *H04L 51/14* (2013.01); *H04L 51/22* (2013.01); *H04L 51/24* (2013.01); *H04L 51/32* (2013.01); *H04L 51/34* (2013.01); *H04L 51/36* (2013.01); *H04L 65/1059* (2013.01); *H04L 67/1085* (2013.01); *H04L 67/142* (2013.01); *H04L 67/2842* (2013.01); *H04L 67/2852* (2013.01); *H04L 67/42* (2013.01)

(58) Field of Classification Search
CPC ....... H04L 51/12; H04L 51/34; H04L 67/142; H04L 12/581; H04L 12/5825; H04L 65/1059; H04L 67/1085; H04L 67/2852; G06F 17/30551; G06F 17/3076; G06F 9/00; G06F 15/16
USPC .................................................. 709/204–206
See application file for complete search history.

(56) References Cited

U.S. PATENT DOCUMENTS

| | | | |
|---|---|---|---|
| 2006/0245530 A1* | 11/2006 | Pradhan | H04W 48/16 375/364 |
| 2012/0173485 A1* | 7/2012 | Kothule | G06F 17/30575 707/634 |
| 2015/0058287 A1* | 2/2015 | Zhang | G06F 17/30575 707/610 |

* cited by examiner

METHOD, SERVER, CLIENT, AND SYSTEM FOR RELEASING INSTANT MESSAGING KEY-VALUE DATA

CROSS-REFERENCES TO RELATED APPLICATIONS

This application is a continuation application of PCT Patent Application No. PCT/CN2014/082695, filed on Jul. 22, 2014, which claims priority to Chinese Patent Application No. 2013103166220, filed on Jul. 25, 2013, the entire contents of both of which are incorporated herein by reference.

FIELD OF THE DISCLOSURE

The present disclosure generally relates to the field of instant messaging technology and, more particularly, relates to a method, a server, a client, and a system for releasing the instant messaging key-value data.

BACKGROUND

In the instant messaging field, technology for releasing key-value data is often used in many business scenarios. For example, when a certain user logs in an instant messaging client, a friend list needs to be pulled from a server. The friend listing includes account number and the data of describing account property (such as the time when is friended) of a friend. This account number as a unique identification can be abstracted as key. The data associated with this account number can be abstracted as value. Each friend of the friend listing corresponds to a record of key-value data. These records of key-value data can form the key-value data of this user.

Currently, in the instant messaging field, the following two methods are generally used for releasing key-value data. One method includes: pulling full amount key-value data from the server, each time when a user logs in an instant messaging client. Another method includes: adding a serial number to the key-value data. Whenever the key-value data of the server change for one time, the serial number is added by one. When the client is firstly logged in, the key-value data and the serial number are pulled from the server and cached in the client. When the client is logged in for next time, the cached serial number is submitted to the server and the server determines whether the serial number submitted by the client is consistent with the local serial number. When the submitted serial number is consistent with the local serial number, the server does not release the key-value data. When the submitted serial number is not consistent with the local serial number, the server releases the full amount key-value data and the latest serial number for the client to locally cache after receiving.

For the above method that the full amount key-value data are pulled from the server, each time when the instant messaging client is logged in, the user key-value data would remain the same and would not have any changes in most of the time, although this can be easily realized and the client does not need to cache the server data. Each time when logging in to pull the full amount key-value data, for the instant messaging service with huge amount of users, network bandwidth may be enormously wasted.

For the above method involving adding a serial number to the key-value data, although the method can avoid waste of the network bandwidth for full-amount pulling key-value data each time when the client logs in, with the development of instant messaging service, the user key-value data become more and more enriched. For example, a user may have about 5000 records of key-value data, and each record of the key-value data may averagely have a length of about 20 bytes, and a total length of the key-value data can thus be about 100 KB. As long as one of the records having the length of 20 bytes changes, the serial number is added by 1. When the client logs in next time, the full amount data of 100K have to be pulled, although only 20 bytes data amount actually need to be released. In this case, the usage rate of the network bandwidth is very low.

BRIEF SUMMARY OF THE DISCLOSURE

One aspect or embodiment of the present disclosure includes a method for releasing instant messaging key-value data. A server receives a request packet for pulling key-value data sent from a client during a login. The request packet at least contains a full-amount pulling time-stamp, an increased-amount pulling time-stamp, and a data-altering serial number. The server selects a pre-set data releasing mechanism according to parameters contained in the request packet, to release full amount key-value data to the client or to release increased amount key-value data to the client, or not to release the key-value data, such that, according to a returned result from the server, the client updates local cache data to display to a user.

Another aspect or embodiment of the present disclosure includes a server for releasing instant messaging key-value data. The server includes a request receiving module and a release processing module. The request receiving module is configured to receive a request packet for pulling key-value data sent from a client during a login. The request packet at least contains a full-amount pulling time-stamp, an increased-amount pulling time-stamp, and a data-altering serial number.

The release processing module is configured to select a pre-set data releasing mechanism according to parameters contained in the request packet, to release full amount key-value data to the client or to release increased amount key-value data to the client, or not to release the key-value data, such that, according to a returned result from the server, the client updates local cache data and displays to a user.

Another aspect or embodiment of the present disclosure includes a method for releasing instant messaging key-value data. A request packet, at least containing a full-amount pulling time-stamp, an increased-amount pulling time-stamp, and a data-altering serial number, for pulling a key-value data is sent. A receiving server releases full amount key-value data or increased amount key-value data according to parameters contained in the request packet. Local cache data are updated according to a returned result from the receiving server.

Another aspect or embodiment of the present disclosure includes a system for releasing instant messaging key-value data. The system includes a client and a server. The client is configured to send a request packet for pulling key-value data from the server during a login, and to update local cache data to display to a user according to a returned result from the server.

The client is further configured to cover the full amount key-value data, the data-altering serial number, the full-amount pulling time-stamp, and the two-dimension check-sum parameter in local cache, when the server returns the full amount key-value data, the data-altering serial number, the full-amount pulling time-stamp, and the two-dimension checksum parameter. The client is further configured to cover the data-altering serial number, the increased-amount pulling time-stamp, and the two-dimension checksum parameter in local cache, when the server returns the increased amount key-value data, the data-altering serial number, the increased-amount pulling time-stamp and the two-dimension checksum parameter by the server. The client is further configured to update the local cache data according to the key of the increased amount key-value data.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-7 depict exemplary methods, servers, and systems for releasing instant messaging key-value data consistent with various disclosed embodiments. The exemplary methods, servers, and systems can be implemented, for example, in an exemplary environment 800 as shown in FIG. 8.

Figure 8:
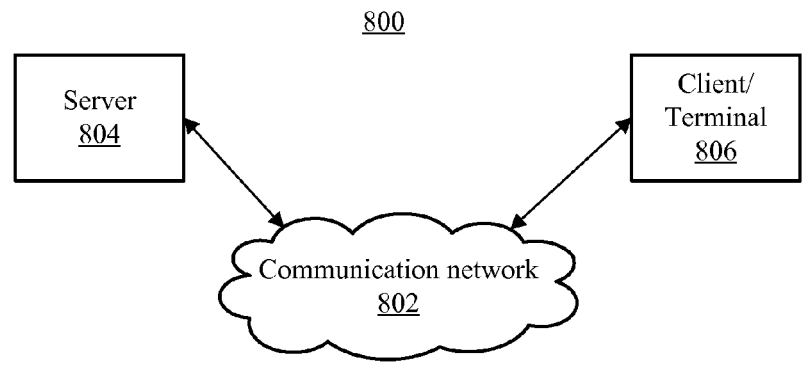
FIG. 8 depicts an exemplary environment incorporating certain disclosed embodiments.

FIG. 8 depicts an exemplary environment 800 incorporating certain disclosed embodiments. As shown in FIG. 8, environment 800 can include a server 804, a client (and/or a terminal) 806, and a communication network 802. The server 804 and the client 806 may be coupled through the communication network 802 for information exchange, such as webpage browsing, Internet searching, data downloading, etc. Although only one client 806 and one server 804 is shown in the environment 800, any number of clients 806 or servers 804 may be included, and other devices may also be included.

Communication network 802 may include any appropriate type of communication network for providing network connections to the server 804 and client 806 or among multiple servers 804 or clients 806. For example, communication network 802 may include the Internet or other types of computer networks or telecommunication networks, either wired or wireless.

A client, as used herein, may refer to any appropriate user terminal with certain computing capabilities, such as a personal computer (PC), a work station computer, a server computer, a hand-held computing device (tablet), a smart phone or mobile phone, or any other user-side computing device.

A server, as used herein, may refer one or more server computers configured to provide certain server functionalities, such as database management and search engines. A server may also include one or more processors to execute computer programs in parallel.

Figure 9:
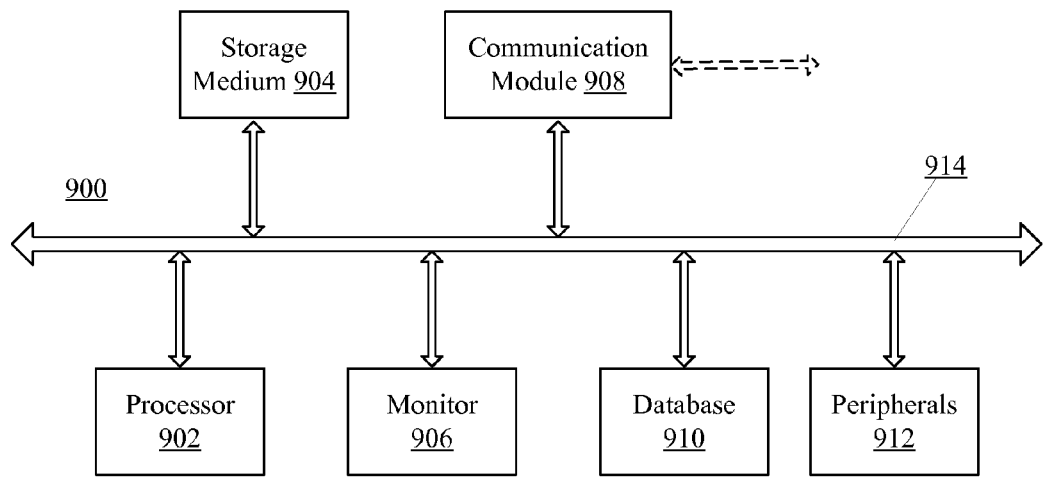
FIG. 9 depicts an exemplary computer system consistent with the disclosed embodiments.

The server 804 and the client/terminal 806 may be implemented on any appropriate computing platform. FIG. 9 shows a block diagram of an exemplary computer system 900 capable of implementing the server 804 and/or the client/terminal 806. As shown in FIG. 9, the exemplary computer system 900 may include a processor 902, a storage medium 904, a monitor 906, a communication module 908, a database 910, peripherals 912, and one or more bus 914 to couple the devices together. Certain devices may be omitted and other devices may be included.

Processor 902 can include any appropriate processor or processors. Further, processor 902 can include multiple cores for multi-thread or parallel processing. Storage medium 904 may include memory modules, such as ROM, RAM, and flash memory modules, and mass storages, such as CD-ROM, U-disk, removable hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network 802. Database 910 may include one or more databases for storing certain data and for performing certain operations on the stored data, such as webpage browsing, database searching, etc.

In operation, client 806 may cause server 804 to perform certain actions, such as an Internet search or other database operations. Server 804 may be configured to provide structures and functions for such actions and operations. More particularly, server 804 may include a data searching system for real-time database searching.

The disclosed methods and systems for seamless webpage browsing (or for seamlessly browsing a webpage), e.g., as depicted in FIGS. 1-5, can be implemented, e.g., using the network environment 800 as depicted in FIG. 8.

In various embodiments, when receiving a request packet for pulling key-value data sent from a client during a login, the server selects a pre-set data releasing mechanism according to parameters contained in the request packet, to release full amount key-value data to the client or to release increased amount key-value data to the client, or not to release the key-value data, such that, according to a returned result from the server, the client updates local cache data to display to a user. The request packet sent from the client at least contains a full-amount pulling time-stamp, an increased-amount pulling time-stamp, and a data-altering serial number.

As such, increased amount releasing of the key-value data can be realized, network bandwidth waste can be reduced, and data consistence of the client and the server of instant messaging can be ensured.

As used herein, the term "full amount releasing" refers to, when a server releases key-value data of a user to a client, the server releases all of the key-value data records.

As used herein, the term "increased amount releasing" refers to, when a server releases key-value data of a user to a client, the server only releases the added, modified, or deleted key-value data records.

Figure 1:
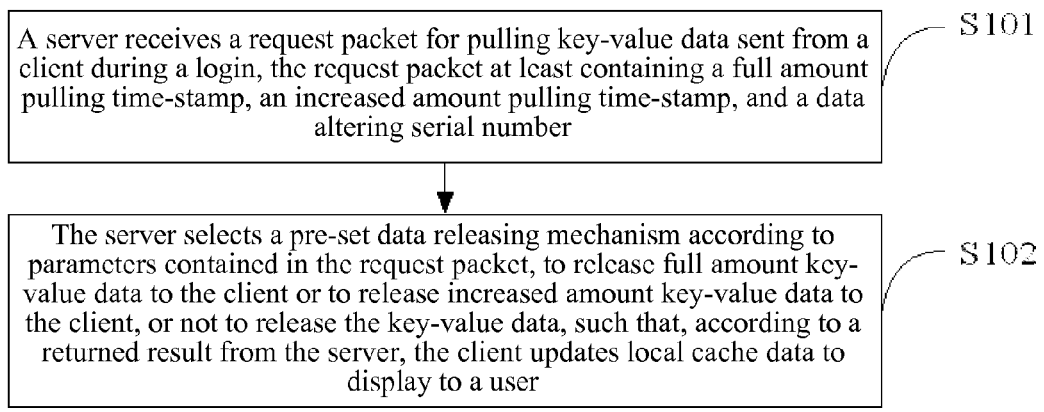
FIG. 1 depicts an exemplary method for releasing instant messaging key-value data consistent with various disclosed embodiments.
Figure 2:
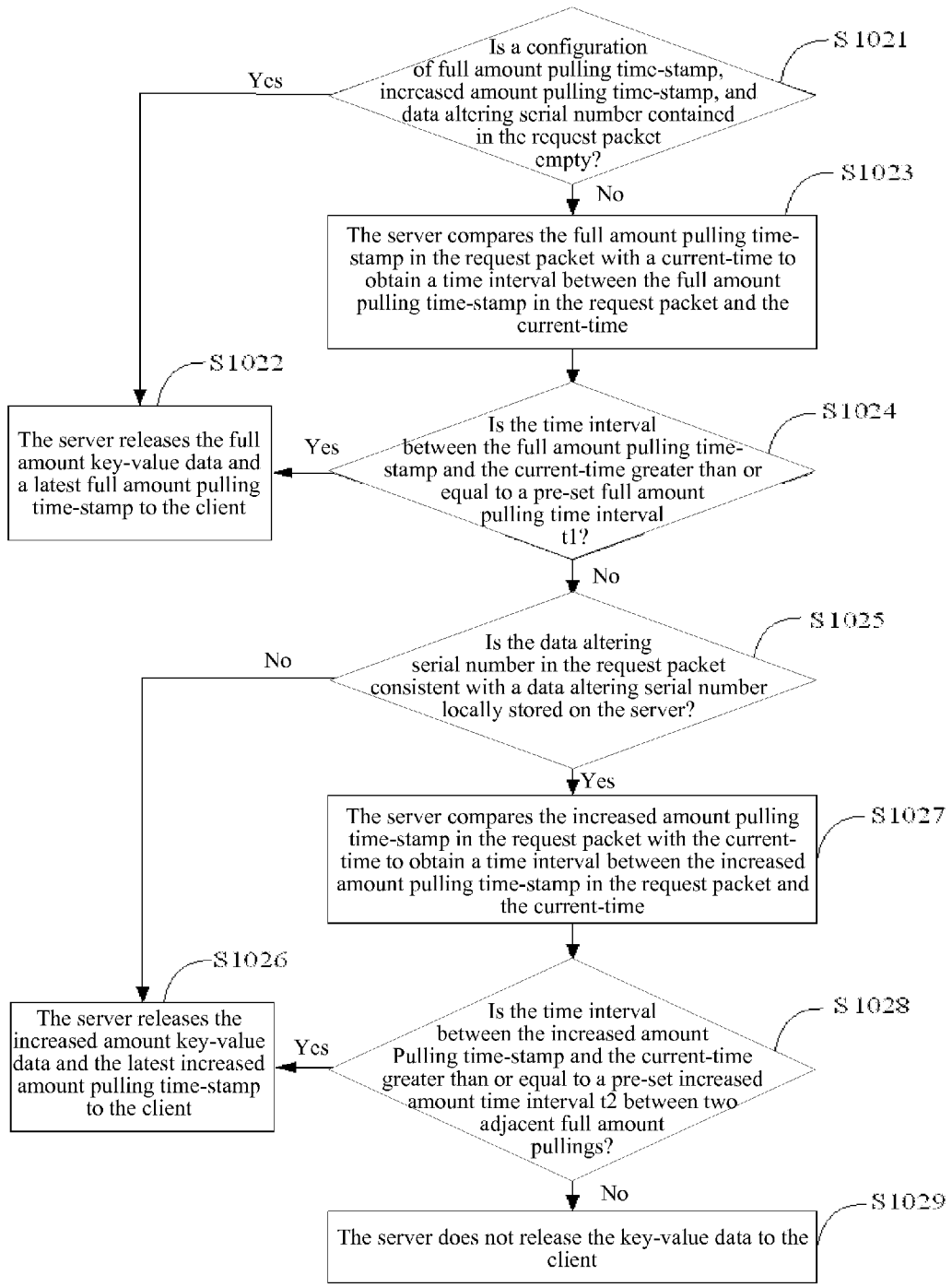
FIG. 2 depicts an exemplary process for selecting a pre-set data releasing mechanism according to parameters contained in a request packet to release full amount key-value data to the client or to release increased amount key-value data to the client, or not to release the key-value data consistent with various disclosed embodiments.

FIG. 1 depicts an exemplary method for releasing instant messaging key-value data consistent with various disclosed embodiments.

In Step S101, a server receives a request packet for pulling key-value data sent from a client during a login, the request packet at least containing a full-amount pulling time-stamp, an increased-amount pulling time-stamp, and a data-altering serial number.

In the embodiment, the operating environment of the disclosed method relates to the client and the server of instant messaging. Increased amount releasing of key-value data of the server can be realized to solve problems due to network bandwidth occupation when the key-value data are released.

Firstly, when the client logs in, the client sends the request packet for pulling the key-value data to the server. The request packet at least contains a full-amount pulling time-stamp, an increased-amount pulling time-stamp, and a data-altering serial number, at the same time. The request packet can further contain a two-dimension checksum parameter, such that the server selects a pre-set corresponding data releasing mechanism to release the key-value data to the client, according to parameters contained in the request packet.

In Step S102, the server selects a pre-set data releasing mechanism according to parameters contained in the request packet, to release full amount key-value data to the client, or to release increased amount key-value data to the client, or not to release the key-value data, such that, according to a returned result from the server, the client updates local cache data to display to a user.

In one embodiment, the data releasing mechanism set by the server includes one or more of a full amount data releasing mechanism using a time-stamp, an increased amount data releasing mechanism using a time-stamp and a serial number, a two-dimension checksum and calculation mechanism, a caching the deleted key on the server mechanism, etc.

For the full amount data releasing mechanism using a time-stamp as the data releasing mechanism, when the client logs in for a first time, the client pulls the full amount data from the server, and records the time-stamp of the full amount data. Then using this first full-amount pulling time-stamp as a basis, at an interval of the full-amount pulling time interval t1, the client completes one full-amount pulling. The time interval t1 for the above-mentioned full-amount pulling can be set according to specific situation.

For the increased amount data releasing mechanism using a time-stamp and a serial number as the data releasing mechanism, in an increased-amount time interval t2 between two adjacent full-amount pullings, it is determined whether to use the increased-amount pulling according to various conditions. For example, when the data-altering serial number of the key-value data cached in the client is not consistent with the data-altering serial number of the key-value data stored on the server, the client can directly initiate this increased-amount data pulling. When the data-altering serial number of the key-value data cached in the client is consistent with the data-altering serial number of the key-value data stored on the server, and when an interval between the time of the last increased-amount pulling and the current-time is greater than or equal to t2, the client can directly initiate this increased-amount data pulling. When the data-altering serial number of the key-value data cached in the client is consistent with the data-altering serial number of the key-value data stored on the server, and when the interval between the time of the last increased-amount pulling and the current-time is less than t2, the client does not initiate this increased-amount data pulling or the server does not release the increased-amount data to the client. As described above, the increased-amount data can refer to the added, modified, or deleted data.

For the two-dimension checksum and calculation mechanism as the data releasing mechanism, the server releases altered or modified key-value data to the client, and does not release any unmodified key-value data to the client.

For caching the deleted key on the server mechanism as the data releasing mechanism, during each time of increased amount pulling, the server returns deleted key deleted during the time interval between the last increased-amount pulling and the present increased-amount pulling to the client for the client to delete corresponding key-value data.

It is noted that, in addition to obtaining the full amount key-value data during the first login, the full-amount data releasing mechanism can be used as protection logic for the increased-amount data releasing mechanism. In practical application, when errors occur to the increased amount data releasing mechanism, the errors can cause the key-value data obtained at the client in disorder. In this case, when the full-amount data are regularly released, the data in disorder can be corrected.

After receiving the returned result from the server, the client updates local cache data to display to a user.

In Step S102 that the server selects the pre-set data releasing mechanism according to parameters contained in the request packet, to release the full amount key-value data to the client, or to release the increased amount key-value data to the client, or not to release the key-value data, various exemplary steps can be included.

For example, in Step S1021, it is determined whether a configuration of the full-amount pulling time-stamp, the increased-amount pulling time-stamp, and the data-altering serial number contained in the request packet is empty. When the configuration is determined empty, Step S1022 can be implemented. When the configuration is determined not empty, Step S1023 can be implemented.

In the case of the first time that the client sends the request, no data are locally cached. The configuration of the full-amount pulling time-stamp, the increased-amount pulling time-stamp, and the data-altering serial number contained in the request packet is empty.

In Step S1022, the server releases the full amount key-value data and a latest full-amount pulling time-stamp to the client.

In Step S1023, the server compares the full-amount pulling time-stamp in the request packet with a current-time to obtain a time interval between the full-amount pulling time-stamp in the request packet and the current-time. Step S1024 can then be implemented.

In Step S1024, it is determined whether the time interval between the full-amount pulling time-stamp and the current-time is greater than or equal to a pre-set full-amount pulling time interval t1. When the time interval is greater than or equal to t1, Step S1022 can be implemented. When the time interval is less than t1, Step S1025 can be implemented.

In Step S1025, it is determined whether the data-altering serial number in the request packet is consistent with a data-altering serial number locally stored on the server. When the data-altering serial number in the request packet is not consistent with the data-altering serial number locally stored on the server, Step S1026 can be implemented. When the data-altering serial number in the request packet is consistent with the data-altering serial number locally stored on the server, Step S1027 can be implemented.

In Step S1026, the server releases the increased amount key-value data and the latest increased-amount pulling time-stamp to the client.

In Step S1027, the server compares the increased-amount pulling time-stamp in the request packet with the current-time, to obtain a time interval between the increased-amount pulling time-stamp in the request packet and the current-time. Step S1028 can then be implemented.

In Step S1028, the server determines whether the time interval between the increased-amount pulling time-stamp and the current-time is greater than or equal to a pre-set increased time interval t2 between two adjacent full-amount pullings. When the time interval between the increased-amount pulling time-stamp and the current-time is greater than or equal to a pre-set increased time interval t2 between two adjacent full-amount pullings, Step S1026 can then be implemented. When the time interval between the increased-amount pulling time-stamp and the current-time is less than a pre-set increased time interval t2 between two adjacent full-amount pullings, Step S1029 can then be implemented.

In Step S1029, the server does not release the key-value data to the client.

The request packet sent from the client can contain a two-dimension checksum parameter. In this case, when the server releases the full amount key-value data to the client, the server simultaneously releases the two-dimension checksum parameter calculated according to the full amount key-value data.

In embodiments, when the server releases the increased account key-value data to the client, the server simultaneously releases the two-dimension checksum parameter calculated according to the full amount key-value data.

In various embodiments, the process of releasing instant messaging key-value data can include the following.

The server can release the full amount key-value data to the client, when the following conditions are satisfied. The conditions include: the configuration of the full-amount pulling time-stamp, the increased-amount pulling time-stamp, the data-altering serial number, and the two-dimension checksum parameter contained in the request packet is empty. Or the configuration of the full-amount pulling time-stamp, the increased-amount pulling time-stamp, the data-altering serial number, and the two-dimension checksum parameter contained in the request packet is not empty, the time interval between the full-amount pulling time-stamp in the request packet from the client and the current-time is greater than or equal to a pre-set full-amount pulling time interval t1. In such conditions, the server can release the full amount key-value data, the latest full-amount pulling time-stamp, and the two-dimension checksum parameter calculated according to the full amount key-value data.

When the following conditions are satisfied, the increased amount key-value data, the latest increased-amount pulling time-stamp, and the two-dimension checksum parameter calculated according to the full amount key-value data are need to be released to the client.

The conditions include: the configuration of the full-amount pulling time-stamp, the increased-amount pulling time-stamp, the data-altering serial number, and the two-dimension checksum parameter contained in the request packet is not empty, and when the time interval between the full-amount pulling time-stamp in the request packet and the current-time is less than the full-amount pulling time interval t1, the data-altering serial number contained in the request packet from the client is not consistent with the data-altering serial number stored in the server; or when the data-altering serial number contained in the request packet of the client is consistent with the data-altering serial number stored on the server, the time interval between the increased-amount pulling time-stamp in the request packet with the current-time is greater than or equal to the increased-amount pulling time interval t2, that is, at every time interval t2, the server is ensured to return the increased amount data, which is used as a correction mechanism when errors occur to the data-altering serial number (for example, the key-value data alters, while the data-altering serial number does not accordingly alter).

The increased amount key-value data contains two portions: the modified or the added key-value data modified or the added since the last pulling, and the key of deleted key-value data deleted since the last pulling.

Figure 3A:
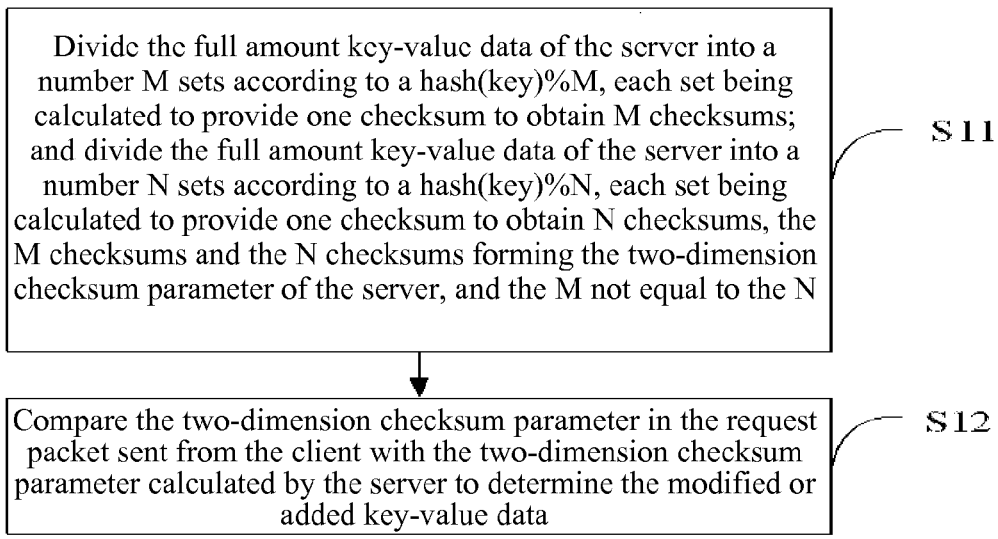
FIG. 3a depicts an exemplary process for the server to determine key-value data modified or added since last pulling consistent with various disclosed embodiments.

Referring to FIG. 3a, in one embodiment, the step that the server determines the modified or the added key-value data modified or the added since the last pulling includes: in Step S11, dividing the full amount key-value data of the server into a number M sets according to a hash(key)%M, each set being calculated to provide one checksum to obtain M checksums; and dividing the full amount key-value data of the server into a number N sets according to a hash(key)%N, each set being calculated to provide one checksum to obtain N checksums. The M checksums and the N checksums form the two-dimension checksum parameter of the server. The two-dimension checksum includes two dimensions including %M and %N, and M is not equal to N.

The checksum parameter can be algorithmically computed using the verification algorithms such as CRC, md5, etc. The above mentioned hash(key) includes mapping the key into an integer number according to the hash algorithm.

In Step S12, the two-dimension checksum parameter in the request packet sent from the client is compared with the two-dimension checksum parameter calculated by the server to determine the modified or added key-value data.

The following example depicts a determining process of the modified or added key-value data according to the two-dimension checksum.

The determining process of the modified or added key-value data includes: setting the two-dimension checksum contained in the request packet of the client as: {client_checksum_x_0, client_checksum_x_1, . . . , client_checksum_x_M−1}, {client_checksum_y_1, client_checksum_y_0, . . . , client_checksum_y_N−1}, and setting the two-dimension checksum calculated by the server as: {server_checksum_x_0, server_checksum_x_1, ..., server_checksum_x_M−1}, {server_checksum_y_0, server_checksum_y_1, ..., server_checksum_y_N−1}.

When the client_checksum_x_0 is not equal to the server checksum_x_0, indicating in the key-value set that the hash(key)%M equals to 0, some key-value data may possibly be modified or added, and the checksums between the server and the client may therefore be inconsistent. In order to further filter/screen among the returned increased-amount key-value data, for each key in the key-value set that the hash(key)%M equals to 0, the key is set as key_k and the hash(key_k)% N equals to K. When the client_checksum_y_K is equal to the server_checksum_y_K, it is indicated that the key-value data corresponding to the key_k are not modified or added. There is no need to add key_k into the key-value that are possibly to be added or modified. When the client_checksum_y_K is not equal to the server_checksum_y_K, it is indicated that the key-value data corresponding to the key_k are possibly to be modified or added and the key_k needs to be added into the added or modified key-value data.

When calculating, the possibly added or modified key-value data are firstly obtained based on the checksum calculated by the key %M, then the portion that key-value data are not actually added or modified is excluded from the possibly added or modified key-value data based on the checksum calculated by the key %N and returned to the client.

In fact, the added or modified key-value data calculated by the above-mentioned method can contain one portion of key-value data that have not been altered (have been remained unchanged), but must contain the added or modified key-value data. In practical application, one-dimension or multi-dimension (two-dimension or greater) checksum calculation method can be used.

Figure 3B:
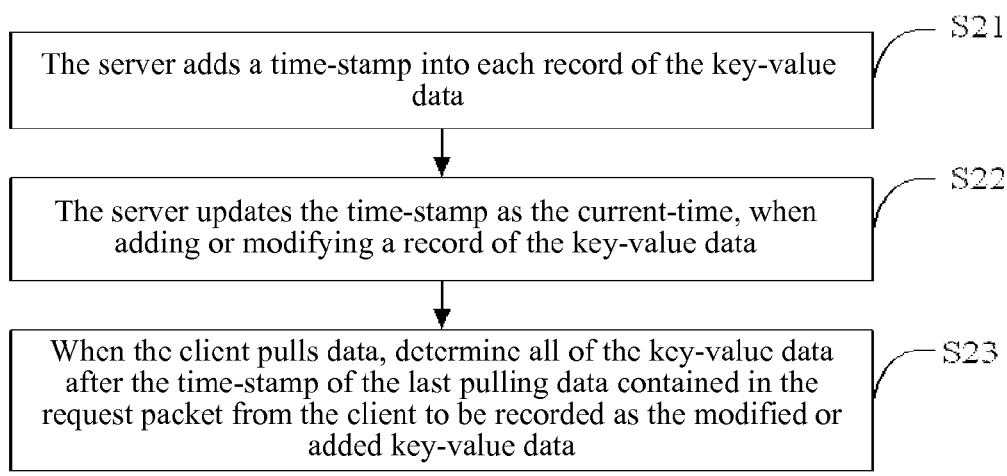
FIG. 3b depicts another exemplary process for the server to determine key-value data modified or added since last pulling consistent with various disclosed embodiments.

Referring to FIG. 3b, in another embodiment, the step that the server determines the modified or the added key-value data since the last pulling includes: in Step S21, adding, by the server, a time-stamp into each record of the key-value data; in Step S22, updating the time-stamp as the current-time, when adding or modifying a record of the key-value data; and in Step S23, when the client pulls data, determining all of the key-value data after the time-stamp of the last pulling data contained in the request packet from the client to be recorded as the modified or added key-value data.

The implementing method of FIG. 3b can be used as an alternative implementing method depicted in FIG. 3a. In the exemplary method of FIG. 3b, when the server processes the increased amount releasing of key-value data, the server may not use the two-dimension checksum calculation mechanism depicted in FIG. 3a, but add a time-stamp to each key-value data record to determine the added or modified key-value data record. When adding or modifying a key-value data record, the server updates the time-stamp as the current-time. Each time when the client pulls the data, the server brings the last time-stamp of pulling data, uses all of the key-value data records after this time-stamp as added or modified key-value data to release to the client. The method in FIG. 3b can accurately determine the added or modified key-value data record. For large amount of key-value data, however, adding a time-stamp to each key-value data record may occupy a mass of storage space.

Figure 3C:
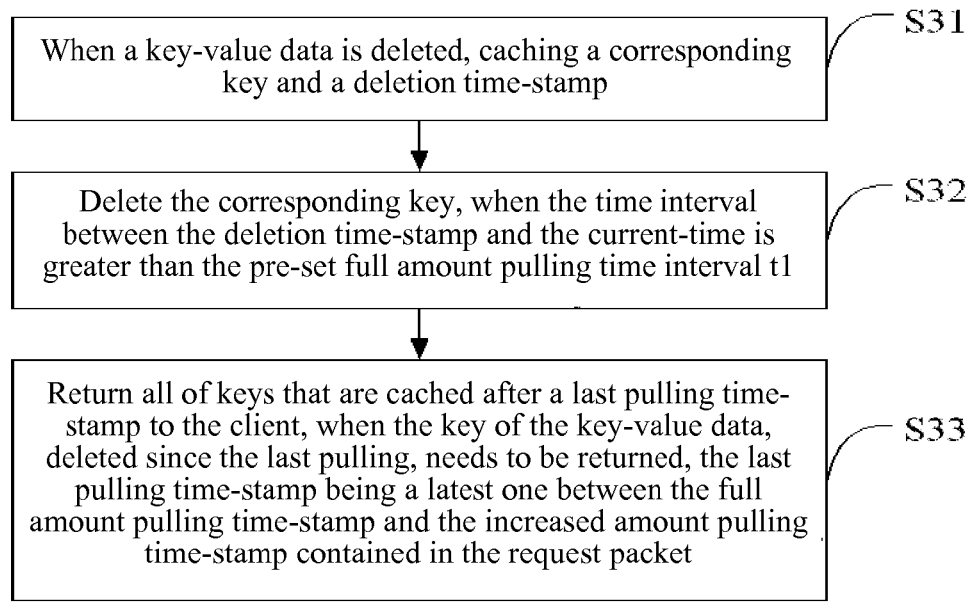
FIG. 3c depicts an exemplary process for the server to determine and release key of key-value data deleted since last pulling consistent with various disclosed embodiments.

Referring to FIG. 3c, the step that the server determines the key of the key-value data deleted since the last pulling includes: in Step S31, when a key-value data is deleted, caching a corresponding key and caching a deletion time-stamp; in Step S32, deleting the corresponding key, when the time interval between the deletion time-stamp and the current-time is greater than the pre-set full-amount pulling time interval t1; and in Step S33, returning all of the keys cached after a last pulling time-stamp to the client, when the key of the key-value data deleted since the last pulling, needs to be returned. The last pulling time-stamp is a latest one of the full-amount pulling time-stamp and the increased-amount pulling time-stamp contained in the request packet. In one embodiment, the key of the deleted key-value data since the last pulling is determined and released by caching the deleted key on the server.

For example, when certain key-value data are deleted, the server can cache the corresponding key and cache the deletion time-stamp. As such, the cached deleted-key may be accumulated, and thus requires a regular cleaning mechanism to clean the deleted key which is no longer used from the cache.

When the interval between the deletion time-stamp of a certain key and the current-time is greater than the full-amount pulling time interval t1, this key can be deleted. This is because at each full-amount pulling time interval t1, the client can initiate a full-amount pulling request to cover the local data, the deleted key which is stored before the full-amount pulling time interval t1 becomes meaningless.

When the key of the key-value data deleted since the last pulling needs to be returned, the server returns all of the keys cached after the last pulling time-stamp to the client. Each time when the client pulls, the full-amount pulling time-stamp and the increased-amount pulling time-stamp can be included, while the last pulling time-stamp can be the latest one selected from the full-amount pulling time-stamp and the increased-amount pulling time-stamp.

Subsequently, the client receives the returned result from the server, and updates the local cache data to display to the user.

For example, when the server returns the full amount key-value data, the data-altering serial number, the full-amount pulling time-stamp and the two-dimension checksum, the client directly covers the full amount key-value data, the data-altering serial number, the full-amount pulling time-stamp and the two-dimension checksum in local cache.

When the server returns the increased amount key-value data, the data-altering serial number, the increased-amount pulling time-stamp and the two-dimension checksum, the client directly covers the data-altering serial number, the increased-amount pulling time-stamp and the two-dimension checksum in local cache, and updates the local cache data according to the key of the increased amount key-value data. For example, the full amount data in the client local cache may include key1-value1, key2-value2, and key3-value3, the increased amount data released from the server may contain key2-value2', key4-value4 and key 3 with deleted key listing. Then the updated full amount data can include key1-value1, key2-value2', and key4 -value4. Among them, it is noticed that, key1-value1 has not been altered, the value of key2 -value2' has been modified as the latest, key3-value3 has been deleted, and key4-value4 has been added.

When the server returns data to the client with the latest data, there is no need to modify the data and the client does not need to process any operations.

As disclosed, when receiving a request packet for pulling key-value data sent from a client during a login, the server selects a pre-set data releasing mechanism according to parameters contained in the request packet, to release full amount key-value data to the client or to release increased amount key-value data to the client or not to release the key-value data, such that, according to a returned result from the server, the client updates local cache data to display to a user. The request packet sent from the client at least contains a full-amount pulling time-stamp, an increased-amount pulling time-stamp, and a data-altering serial number. As such, increased amount releasing of the key-value data can be realized, network bandwidth waste can be reduced, and data consistence of the client and the server of instant messaging can be ensured.

Figure 4:
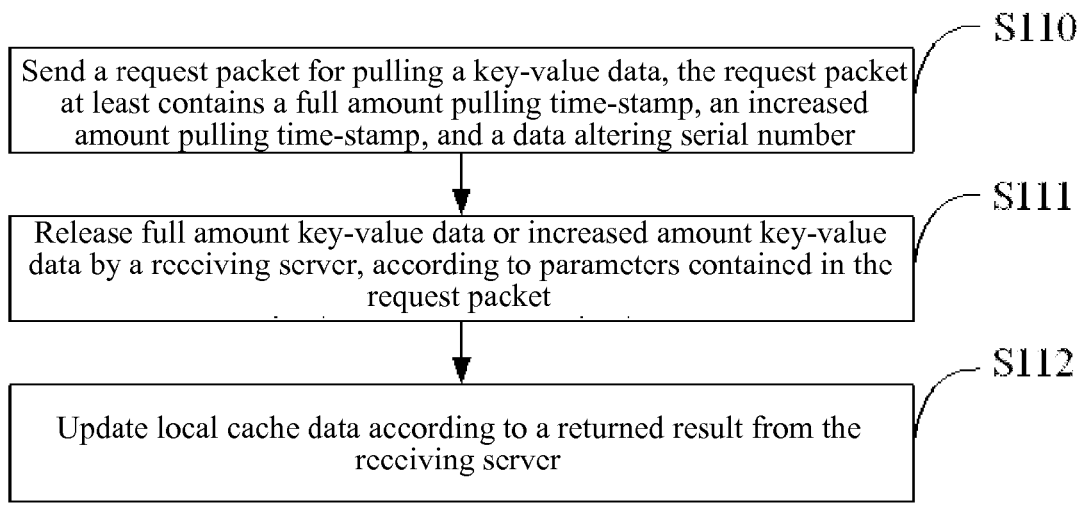
FIG. 4 depicts another exemplary method for releasing instant messaging key-value data consistent with various disclosed embodiments.

FIG. 4 depicts another exemplary method for releasing instant messaging key-value data consistent with various disclosed embodiments.

In Step S110, a request packet for pulling a key-value data is sent to a receiving server. The request packet at least contains a full-amount pulling time-stamp, an increased-amount pulling time-stamp, and/or a data-altering serial number.

In Step S111, a full amount key-value data or an increased amount key-value data are released by the receiving server, according to parameters contained in the request packet.

In Step S112, local cache data are updated according to a returned result from the server.

For example, by interaction between the client and the server, the server can release increased amount releasing of the key-value data to the client, to solve problems due to network bandwidth occupation when the key-value data are released.

Firstly, when the client logs in, the client sends the request packet for pulling the key-value data to the server. The request packet at least contains a full-amount pulling time-stamp, an increased-amount pulling time-stamp, and a data-altering serial number, at the same time. The request packet can further contain a two-dimension checksum parameter, such that the server selects a pre-set corresponding data releasing mechanism to release the key-value data to the client, according to parameters contained in the request packet.

In one embodiment, the data releasing mechanism set by the server includes one or more of a full amount data releasing mechanism using a time-stamp, an increased amount data releasing mechanism using a time-stamp and a serial number, a two-dimension checksum and calculation mechanism, a caching the deleted key on the server mechanism, etc.

For the full amount data releasing mechanism using a time-stamp as the data releasing mechanism, when the client logs in for a first time, the client pulls the full amount data from the server, and records the time-stamp of the full amount data. Then using this first full-amount pulling time-stamp as a basis, at an interval of the full-amount pulling time interval t1, the client completes one full-amount pulling. The time interval t1 for the above-mentioned full-amount pulling can be set according to specific situation.

For the increased amount data releasing mechanism using a time-stamp and a serial number as the data releasing mechanism, in an increased-amount time interval t2 between two adjacent full-amount pullings, it is determined whether to use the increased-amount pulling according to various conditions. For example, when the data-altering serial number of the key-value data cached in the client is not consistent with the data-altering serial number of the key-value data stored on the server, the client can directly initiate this increased-amount data pulling. When the data-altering serial number of the key-value data cached in the client is consistent with the data-altering serial number of the key-value data stored on the server, and when an interval between the time of the last increased-amount pulling and the current-time is greater than or equal to t2, the client can directly initiate this increased-amount data pulling. When the data-altering serial number of the key-value data cached in the client is consistent with the data-altering serial number of the key-value data stored on the server, and when the interval between the time of the last increased-amount pulling and the current-time is less than t2, the client does not initiate this increased-amount data pulling or the server does not release the increased-amount data to the client. As described above, the increased-amount data can refer to the added, modified, or deleted data.

For the two-dimension checksum and calculation mechanism as the data releasing mechanism, the server releases altered or modified key-value data to the client, and does not release any unmodified key-value data to the client.

For caching the deleted key on the server mechanism as the data releasing mechanism, during each time of increased amount pulling, the server returns deleted key deleted during the time interval between the last increased-amount pulling and the present increased-amount pulling to the client for the client to delete corresponding key-value data.

It is noted that, in addition to obtaining the full amount key-value data during the first login, the full-amount data releasing mechanism can be used as protection logic for the increased-amount data releasing mechanism. In practical application, when errors occur to the increased amount data releasing mechanism, the errors can cause the key-value data obtained at the client in disorder. In this case, when the full-amount data are regularly released, the data in disorder can be corrected.

After receiving the returned result from the server, the client updates local cache data to display to a user.

For example, when the server returns the full amount key-value data, the data-altering serial number, the full-amount pulling time-stamp and the two-dimension checksum, the client directly covers the full amount key-value data, the data-altering serial number, the full-amount pulling time-stamp and the two-dimension checksum in local cache.

When the server returns the increased amount key-value data, the data-altering serial number, the increased-amount pulling time-stamp and the two-dimension checksum, the client directly covers the data-altering serial number, the increased-amount pulling time-stamp and the two-dimension checksum in local cache, and updates the local cache data according to the key of the increased amount key-value data. For example, the full amount data in the client local cache may include key1-value1, key2-value2, and key3-value3, the increased amount data released from the server may contain key2-value2', key4-value4 and key 3 with deleted key listing. Then the updated full amount data can include key1-value1, key2-value2', and key4 -value4. Among them, it is noticed that, key1-value1 has not been altered, the value of key2 -value2' has been modified as the latest, key3-value3 has been deleted, and key4 -value4 has been added.

When the server returns data to the client with the latest data, there is no need to modify the data and the client does not need to process any operations.

In various embodiments, the interaction between the client and the server can realize release of the instant messaging key-value, which can be the same or similar to the methods as described above.

As disclosed, when receiving a request packet for pulling key-value data sent from a client during a login, the server selects a pre-set data releasing mechanism according to parameters contained in the request packet, to release full amount key-value data to the client or to release increased amount key-value data to the client or not to release the key-value data, such that, according to a returned result from the server, the client updates local cache data to display to a user. The request packet sent from the client at least contains a full-amount pulling time-stamp, an increased-amount pulling time-stamp, and a data-altering serial number. As such, increased amount releasing of the key-value data can be realized, network bandwidth waste can be reduced, and data consistence of the client and the server of instant messaging can be ensured.

Figure 5:
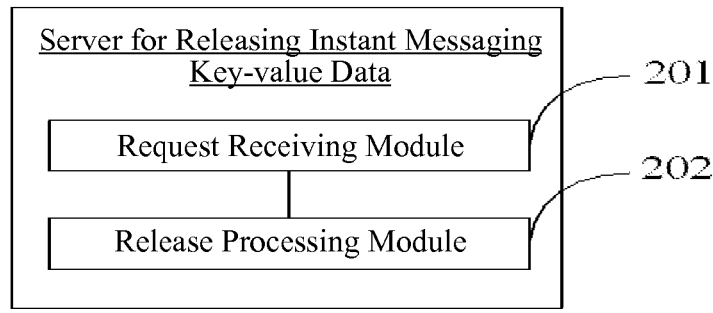
FIG. 5 depicts an exemplary server for releasing instant messaging key-value data consistent with various disclosed embodiments.

FIG. 5 depicts an exemplary server for releasing instant messaging key-value data consistent with various disclosed embodiments. The exemplary server includes a request receiving module 201 and a release processing module 202.

The request receiving module 201 is configured to receive a request packet for pulling key-value data sent from a client during a login, the request packet at least containing a full-amount pulling time-stamp, an increased-amount pulling time-stamp, and a data-altering serial number.

The release processing module 202 is configured to select a pre-set data releasing mechanism according to parameters contained in the request packet, to release full amount key-value data to the client, or to release increased amount key-value data to the client, or not to release the key-value data, such that the client updates local cache data to display to a user according to a returned result from the server.

In one embodiment, increased amount releasing of the key-value data of the server can be realized to solve problems due to network bandwidth occupation when the key-value data are released.

Firstly, when the client logs in, the client sends the request packet for pulling the key-value data to the server. The request packet at least contains a full-amount pulling time-stamp, an increased-amount pulling time-stamp, and a data-altering serial number, at the same time. The request packet can further contain a two-dimension checksum parameter, such that the server selects a pre-set corresponding data releasing mechanism to release the key-value data to the client, according to parameters contained in the request packet.

The server receives the request packet for pulling key-value data sent from the client during a login by the request receiving module 201.

The release processing module 202 selects the pre-set data releasing mechanism according to parameters contained in the request packet, to determine whether to release the data, or how (or by what method) to release the key-value data.

In one embodiment, the data releasing mechanism set by the server includes one or more of a full amount data releasing mechanism using a time-stamp, an increased amount data releasing mechanism using a time-stamp and a serial number, a two-dimension checksum and calculation mechanism, a caching the deleted key on the server mechanism, etc.

For the full amount data releasing mechanism using a time-stamp as the data releasing mechanism, when the client logs in for a first time, the client pulls the full amount data from the server, and records the time-stamp of the full amount data. Then using this first full-amount pulling time-stamp as a basis, at an interval of the full-amount pulling time interval t1, the client completes one full-amount pulling. The time interval t1 for the above-mentioned full-amount pulling can be set according to specific situation.

For the increased amount data releasing mechanism using a time-stamp and a serial number as the data releasing mechanism, in an increased-amount time interval t2 between two adjacent full-amount pullings, it is determined whether to use the increased-amount pulling according to various conditions. For example, when the data-altering serial number of the key-value data cached in the client is not consistent with the data-altering serial number of the key-value data stored on the server, the client can directly initiate this increased-amount data pulling. When the data-altering serial number of the key-value data cached in the client is consistent with the data-altering serial number of the key-value data stored on the server, and when an interval between the time of the last increased-amount pulling and the current-time is greater than or equal to t2, the client can directly initiate this increased-amount data pulling. When the data-altering serial number of the key-value data cached in the client is consistent with the data-altering serial number of the key-value data stored on the server, and when the interval between the time of the last increased-amount pulling and the current-time is less than t2, the client does not initiate this increased-amount data pulling or the server does not release the increased-amount data to the client. As described above, the increased-amount data can refer to the added, modified, or deleted data.

For the two-dimension checksum and calculation mechanism as the data releasing mechanism, the server releases altered or modified key-value data to the client, and does not release any unmodified key-value data to the client.

For caching the deleted key on the server mechanism as the data releasing mechanism, during each time of increased amount pulling, the server returns deleted key deleted during the time interval between the last increased-amount pulling and the present increased-amount pulling to the client for the client to delete corresponding key-value data.

It is noted that, in addition to obtaining the full amount key-value data during the first login, the full-amount data releasing mechanism can be used as protection logic for the increased-amount data releasing mechanism. In practical application, when errors occur to the increased amount data releasing mechanism, the errors can cause the key-value data obtained at the client in disorder. In this case, when the full-amount data are regularly released, the data in disorder can be corrected. After receiving the returned result from the server, the client updates local cache data to display to a user.

Figure 6:
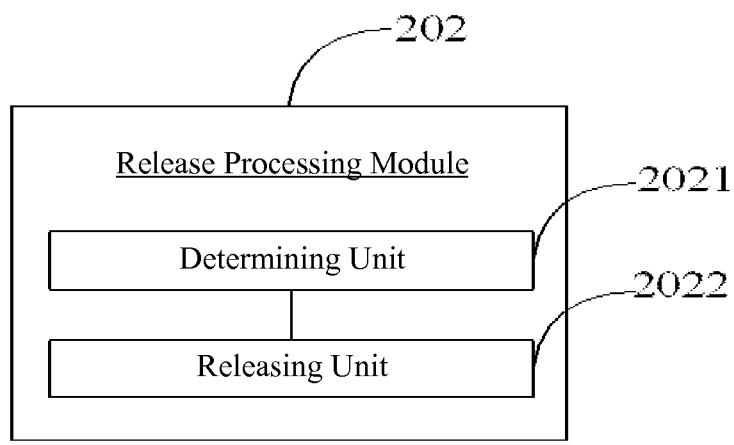
FIG. 6 depicts an exemplary release processing module in a server for releasing instant messaging key-value data consistent with various disclosed embodiments.

FIG. 6 depicts an exemplary release processing module 202 for example including a determining unit 2021 and a releasing unit 2022.

The determining unit 2021 is configured to determine whether a configuration of the full-amount pulling time-stamp, the increased-amount pulling time-stamp, and the data-altering serial number contained in the request packet is empty.

In the case of the first time that the client sends the request, no data are locally cached. The configuration of the full-amount pulling time-stamp, the increased-amount pulling time-stamp, and the data-altering serial number contained in the request packet is empty.

The releasing unit 2022 is configured to release the full amount key-value data and a latest full-amount pulling time-stamp to the client when the configuration of the full-amount pulling time-stamp, the increased-amount pulling time-stamp, and the data-altering serial number contained in the request packet is empty; to compare the full-amount pulling time-stamp in the request packet with a current-time to obtain a time interval between the full-amount pulling time-stamp in the request packet and the current-time when the configuration is not empty; and to release the full amount key-value data and a latest full-amount pulling time-stamp to the client, when the time interval between the full-amount pulling time-stamp and the current-time is greater than or equal to a pre-set full-amount pulling time interval t1.

In addition, the releasing unit 2022 is further configured to determine whether the data-altering serial number in the request packet is consistent with a data-altering serial number locally stored on the server when the time interval between the full-amount pulling time-stamp and the current-time is less than a pre-set full-amount pulling time interval t1. When the data-altering serial number in the request packet is not consistent with a data-altering serial number locally stored on the server, the releasing unit 2022 is further configured to release the increased amount key-value data and the latest increased-amount pulling time-stamp to the client. When the data-altering serial number in the request packet is consistent with a data-altering serial number locally stored on the server, the releasing unit 2022 is further configured to compare the increased-amount pulling time-stamp in the request packet with the current-time and to obtain a time interval between the increased-amount pulling time-stamp in the request packet and the current-time. When the time interval between the increased-amount pulling time-stamp and the current-time is greater than or equal to a pre-set increased time interval t2 between two adjacent full-amount pullings, the releasing unit 2022 is further configured to release the increased amount key-value data and the latest increased-amount pulling time-stamp to the client. When the time interval between the increased-amount pulling time-stamp and the current-time is less than to a pre-set increased time interval t2 between two adjacent full-amount pullings, the releasing unit 2022 is further configured not to release the key-value data to the client.

The request packet sent from the client can contain a two-dimension checksum parameter. In this case, when the server releases the full amount key-value data to the client, the server simultaneously releases the two-dimension checksum parameter calculated according to the full amount key-value data.

In embodiments, when the server releases the increased account key-value data to the client, the server simultaneously releases the two-dimension checksum parameter calculated according to the full amount key-value data.

In various embodiments, the process of releasing instant messaging key-value data can include the following.

The server can release the full amount key-value data to the client, when the following conditions are satisfied. The conditions include: the configuration of the full-amount pulling time-stamp, the increased-amount pulling time-stamp, the data-altering serial number, and the two-dimension checksum parameter contained in the request packet is empty. Or the configuration of the full-amount pulling time-stamp, the increased-amount pulling time-stamp, the data-altering serial number, and the two-dimension checksum parameter contained in the request packet is not empty, the time interval between the full-amount pulling time-stamp in the request packet from the client and the current-time is greater than or equal to a pre-set full-amount pulling time interval t1. In such conditions, the server can release the full amount key-value data, the latest full-amount pulling time-stamp, and the two-dimension checksum parameter calculated according to the full amount key-value data.

When the following conditions are satisfied, the increased amount key-value data, the latest increased-amount pulling time-stamp, and the two-dimension checksum parameter calculated according to the full amount key-value data are need to be released to the client.

The conditions include: the configuration of the full-amount pulling time-stamp, the increased-amount pulling time-stamp, the data-altering serial number, and the two-dimension checksum parameter contained in the request packet is not empty, and when the time interval between the full-amount pulling time-stamp in the request packet and the current-time is less than the full-amount pulling time interval t1, the data-altering serial number contained in the request packet from the client is not consistent with the data-altering serial number stored in the server; or when the data-altering serial number contained in the request packet of the client is consistent with the data-altering serial number stored on the server, the time interval between the increased-amount pulling time-stamp in the request packet with the current-time is greater than or equal to the increased-amount pulling time interval t2, that is, at every time interval t2, the server is ensured to return the increased amount data, which is used as a correction mechanism when errors occur to the data-altering serial number (for example, the key-value data alters, while the data-altering serial number does not accordingly alter).

The increased amount key-value data contains two portions: the modified or the added key-value data modified or the added since the last pulling, and the key of deleted key-value data deleted since the last pulling.

In one embodiment, the following methods can be used when the releasing unit 2022 determines the modified or added key-value data since last pulling.

In such method, the full amount key-value data of the server are divided into a number M sets according to a hash(key)%M, each set being calculated to provide one checksum to obtain M checksums. And the full amount key-value data of the server are divided into a number N sets according to a hash(key)%N, each set being calculated to provide one checksum to obtain N checksums. The M checksums and the N checksums form the two-dimension checksum parameter of the server. The two-dimension checksum includes two dimensions including %M and %N, and M is not equal to N.

The checksum parameter can be algorithmically computed using the verification algorithms such as CRC, md5, etc. The above mentioned hash(key) includes mapping the key into an integer number according to the hash algorithm.

Then, the two-dimension checksum parameter in the request packet sent from the client is compared with the two-dimension checksum parameter calculated by the server to determine the modified or added key-value data.

The following example depicts a determining process of the modified or added key-value data according to the two-dimension checksum.

The determining process of the modified or added key-value data includes: setting the two-dimension checksum contained in the request packet of the client as: {client_checksum_x_0, client_checksum_x_1, . . . , client_checksum_x_M−1}, {client_checksum_y_1, client_checksum_y_0, . . . , client_checksum_y_N−1}, and setting the two-dimension checksum calculated by the server as: {server_checksum_x_0, server_checksum_x_1, . . . , server_checksum_x_M−1}, {server_checksum_y_0, server_checksum_y_1, . . . , server_checksum_y_N−1}.

When the client_checksum_x_0 is not equal to the server_checksum_x_0, indicating in the key-value set that the hash(key)%M equals to 0, some key-value data may possibly be modified or added, the checksums between the server and the client may therefore be inconsistent. In order to further filter/screen among the returned increased-amount key-value data, for each key in the key-value set that the hash(key)%M equals to 0, the key is set as key_k and the hash(key_k)% N equals to K. When the client_checksum_y_K is equal to the server_checksum_y_K, it is indicated that the key-value data corresponding to the key_k are not modified or added. There is no need to add key_k into the key-value that are possibly to be added or modified. When the client_checksum_y_K is not equal to the server_checksum_y_K, it is indicated that the key-value data corresponding to the key_k are possibly to be modified or added and the key_k needs to be added into the added or modified key-value data.

When calculating, the possibly added or modified key-value data are firstly obtained based on the checksum calculated by the key %M, then the portion that key-value data are not actually added or modified is excluded from the possibly added or modified key-value data based on the checksum calculated by the key %N and returned to the client.

In fact, the added or modified key-value data calculated by the above-mentioned method can contain one portion of key-value data that have not been altered (have been remained unchanged), but must contain the added or modified key-value data. In practical application, one-dimension or multi-dimension (two-dimension or greater) checksum calculation method can be used.

In another embodiment, following methods can be used when the releasing unit 2022 determines the modified or the added key-value data since the last pulling.

The releasing unit 2022 adds a time-stamp into each record of the key-value data; updates the time-stamp as the current-time, when adding or modifying a record of the key-value data; when the client pulls data, and determines all of the key-value data after the time-stamp of the last pulling data contained in the request packet from the client to be recorded as the modified or added key-value data.

Alternatively, in an exemplary method, when the server processes the increased amount releasing of key-value data, the server may not use the two-dimension checksum calculation mechanism depicted in FIG. 3a, but add a time-stamp to each key-value data record to determine the added or modified key-value data record. When adding or modifying a key-value data record, the server updates the time-stamp as the current-time. Each time when the client pulls the data, the server brings the last time-stamp of pulling data, uses all of the key-value data records after this time-stamp as added or modified key-value data to release to the client. The method in FIG. 3b can accurately determine the added or modified key-value data record. For large amount of key-value data, however, adding a time-stamp to each key-value data record may occupy a mass of storage space.

In addition, in one embodiment, the releasing unit 2022 is further configured to cache a corresponding key and to cache a deletion time-stamp when a key-value data is deleted; to delete the corresponding key, when the time interval between the deletion time-stamp and the current-time is greater than the pre-set full-amount pulling time interval t1; and to return all of the keys cached after a last pulling time-stamp to the client, when the key of the key-value data deleted since the last pulling, needs to be returned. The last pulling time-stamp is a latest one of the full-amount pulling time-stamp and the increased-amount pulling time-stamp contained in the request packet.

In one embodiment, the key of the deleted key-value data since the last pulling is determined and released by caching the deleted key on the server.

For example, when certain key-value data are deleted, the server can cache the corresponding key and the deletion time-stamp. As such, the cached deleted-key may be accumulated, and thus requires a regular cleaning mechanism to clean the deleted key which is no longer used from the cache.

When the interval between the deletion time-stamp of a certain key and the current-time is greater than the full-amount pulling time interval t1, this key can be deleted. This is because at each full-amount pulling time interval t1, the client can initiate a full-amount pulling request to cover the local data, the deleted key which is stored before the full-amount pulling time interval t1 becomes meaningless.

When the key of the key-value data deleted since the last pulling needs to be returned, the server returns all of the keys cached after the last pulling time-stamp to the client. Each time when the client pulls, the full-amount pulling time-stamp and the increased-amount pulling time-stamp can be included, while the last pulling time-stamp can be the latest one selected from the full-amount pulling time-stamp and the increased-amount pulling time-stamp.

Subsequently, the client receives the returned result from the server, and updates the local cache data to display to the user.

For example, when the server returns the full amount key-value data, the data-altering serial number, the full-amount pulling time-stamp and the two-dimension checksum, the client directly covers the full amount key-value data, the data-altering serial number, the full-amount pulling time-stamp and the two-dimension checksum in local cache.

When the server returns the increased amount key-value data, the data-altering serial number, the increased-amount pulling time-stamp and the two-dimension checksum, the client directly covers the data-altering serial number, the increased-amount pulling time-stamp and the two-dimension checksum in local cache, and updates the local cache data according to the key of the increased amount key-value data. For example, the full amount data in the client local cache may include key1-value1, key2-value2, and key3-value3, the increased amount data released from the server may contain key2-value2', key4-value4 and key 3 with deleted key listing. Then the updated full amount data can include key1-value1, key2-value2', and key4 -value4. Among them, it is noticed that, key1-value1 has not been altered, the value of key2 -value2' has been modified as the latest, key3-value3 has been deleted, and key4-value4 has been added.

When the server returns data to the client with the latest data, there is no need to modify the data and the client does not need to process any operations.

As disclosed, when receiving a request packet for pulling key-value data sent from a client during a login, the server selects a pre-set data releasing mechanism according to parameters contained in the request packet, to release full amount key-value data to the client or to release increased amount key-value data to the client or not to release the key-value data, such that, according to a returned result from the server, the client updates local cache data to display to a user. The request packet sent from the client at least contains a full-amount pulling time-stamp, an increased-amount pulling time-stamp, and a data-altering serial number. As such, increased amount releasing of the key-value data can be realized, network bandwidth waste can be reduced, and data consistence of the client and the server of instant messaging can be ensured.

Figure 7:
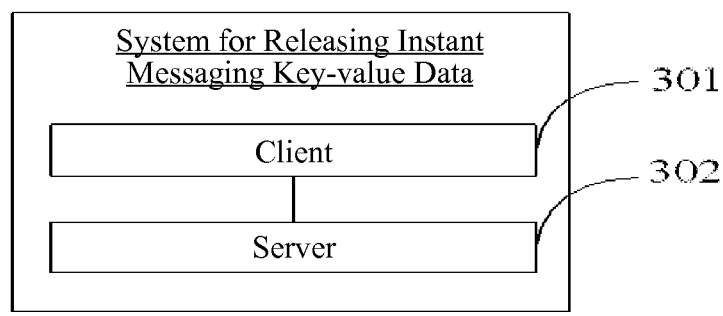
FIG. 7 depicts an exemplary system for releasing instant messaging key-value data consistent with various disclosed embodiments.

FIG. 7 depicts an exemplary system for releasing instant messaging key-value data consistent with various disclosed embodiments. The exemplary system includes a client 301 and a server 302. In various embodiments, the client 301 can include the client 806 depicted in FIG. 8, while the server 302 can include the server 804 depicted in FIG. 8.

The client 301 is configured to send a request packet for pulling a key-value data to a server during a login; and to update the local cache data according to a returned result from the server.

The server 302 can include the server as described above. The server 302 is configured to receive the request packet for pulling the key-value data when the client logs in.

The request packet at least contains a full-amount pulling time-stamp, an increased-amount pulling time-stamp, and a data-altering serial number, at the same time. According to the parameter contained by the request packet, the server 302 selects a pre-set data releasing mechanism to release the full amount key-value data or the increase amount key-value data to the client, or not to release the key-value data, and the client updates local cache data to display to a user according to the returned result from the server.

In various embodiments, the interaction between the client and the server can realize release of the instant messaging key-value, which can be the same or similar to the methods as described above.

The client 301 is further configured to cover the full amount key-value data, the data-altering serial number, the full-amount pulling time-stamp, and the two-dimension checksum in local cache, when the server returns the full amount key-value data, the data-altering serial number, the full-amount pulling time-stamp and the two-dimension checksum; to cover the data-altering serial number, the increased-amount pulling time-stamp, and the two-dimension checksum parameter in local cache, when the server returns the increased-amount key-value data, the data-altering serial number, the increased-amount pulling time-stamp, and the two-dimension checksum, and to update the locally cached data according to the key of the increased-amount key-value data.

In the disclosed methods, servers, clients, and systems for releasing instant messaging key-value data, when receiving a request packet for pulling key-value data sent from a client during a login, the server selects a pre-set data releasing mechanism according to parameters contained in the request packet, to release full amount key-value data to the client or to release increased amount key-value data to the client or not to release the key-value data, such that, according to a returned result from the server, the client updates local cache data to display to a user. The request packet sent from the client at least contains a full-amount pulling time-stamp, an increased-amount pulling time-stamp, and a data-altering serial number. As such, increased amount releasing of the key-value data can be realized, network bandwidth waste can be reduced, and data consistence of the client and the server of instant messaging can be ensured.

In certain embodiments, an apparatus for releasing a key-value data applied for instant messaging can include, for example, a client-side caching module, a server-side key-value data storing module, a server-side deleted-key caching module, and/or a server-side general controlling module.

The client-side caching module can be configured to cache the key-value data, the data-altering serial number of the key-value data, the full amount pulling time-stamp and the two-dimension checksum parameter. The server-side key-value data storing module can be configured to store the latest key-value data and the data altering serial number of the key-value of the user. The server-side deleted-key caching module can be configured to store all of the deleted keys within the full amount pulling time interval t1. The server-side general controlling module is configured to central- izedly process requests corresponding to the key-value data, and release the key-value data to the client.

Various data releasing mechanisms are provided herein. For the full amount data releasing mechanism using a time-stamp as the data releasing mechanism, when the client logs in for a first time, the client pulls the full amount data from the server, and records the time-stamp of the full amount data. Then using this first full-amount pulling time-stamp as a basis, at an interval of the full-amount pulling time interval t1, the client completes one full-amount pulling. The time interval t1 for the above-mentioned full-amount pulling can be set according to specific situation.

For the increased amount data releasing mechanism using a time-stamp and a serial number as the data releasing mechanism, within a time interval between two adjacent full amount pullings, only the added, modified, and/or deleted key-value data record are released.

For the two-dimension checksum and calculation mechanism as the data releasing mechanism, when the server releases the increased amount data, the server fully releases altered or modified key-value data to the client, but does not release any non-altered or unmodified key-value data to the client.

For caching the deleted key on the server mechanism as the data releasing mechanism, during each time of increased amount pulling, the server returns deleted key deleted during the time interval between the last increased-amount pulling and the present increased-amount pulling to the client for the client to delete corresponding key-value data.

It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

In the present disclosure each embodiment is progressively described, i.e., each embodiment is described and focused on difference between embodiments. Similar and/or the same portions between various embodiments can be referred to with each other. In addition, exemplary apparatus and/or systems are described with respect to corresponding methods.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. A variety of components described herein including elements, modules, units, engines, and services can be executed in the computing system. The methods, apparatus, and/or systems can be implemented in a software manner. Of course, the methods, apparatus, and/or systems can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

In various embodiments, the disclosed units/modules can be configured in one apparatus (e.g., a processing unit) or configured in multiple apparatus as desired. The units/modules disclosed herein can be integrated in one unit/module or in multiple units/modules. Each of the units/modules disclosed herein can be divided into one or more sub-units/modules, which can be recombined in any manner. In addition, the units/modules can be directly or indirectly coupled or otherwise communicated with each other, e.g., by suitable interfaces.

One of ordinary skill in the art would appreciate that suitable software and/or hardware (e.g., a universal hardware platform) may be included and used in the disclosed methods, apparatus, and/or systems. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In the disclosed methods, servers, clients, and systems for releasing instant messaging key-value data, when receiving a request packet for pulling key-value data sent from a client during a login, the server selects a pre-set data releasing mechanism according to parameters contained in the request packet, to release full amount key-value data to the client or to release increased amount key-value data to the client or not to release the key-value data, such that, according to a returned result from the server, the client updates local cache data to display to a user. The request packet sent from the client at least contains a full-amount pulling time-stamp, an increased-amount pulling time-stamp, and a data-altering serial number. As such, increased amount releasing of the key-value data can be realized, network bandwidth waste can be reduced, and data consistence of the client and the server of instant messaging can be ensured.

What is claimed is:

1. A method for releasing instant messaging key-value data, comprising:
   receiving, by a server, a request packet for pulling key-value data sent from a client during a login, wherein the request packet at least contains a full-amount pulling time-stamp, an increased-amount pulling time-stamp, and a data-altering serial number; and
   selecting, by a server, a pre-set data releasing mechanism according to parameters contained in the request packet, to release full amount key-value data to the client or to release increased amount key-value data to the client, or not to release the key-value data, such that, according to a returned result from the server, the client updates local cache data to display to a user;
   wherein the step of selecting the pre-set data releasing mechanism includes:
   determining whether a configuration of the full-amount pulling time-stamp, the increased-amount pulling time-stamp, and the data-altering serial number contained in the request packet is empty;
   releasing, by the server, the full amount key-value data and a latest full-amount pulling time-stamp to the client, when the configuration is determined empty;
   comparing the full-amount pulling time-stamp in the request packet with a current-time to obtain a time interval between the full-amount pulling time-stamp in the request packet and the current-time, when the configuration is determined not empty; and
   releasing the full amount key-value data and the latest full-amount pulling time-stamp to the client, when the time interval between the full-amount pulling time-stamp and the current-time is greater than or equal to a pre-set full-amount pulling time interval t1.

2. The method according to claim 1, further including:
   determining whether the data-altering serial number in the request packet is consistent with a data-altering serial number locally stored on the server, when the time interval between the full-amount pulling time-stamp and the current-time is less than a pre-set full-amount pulling time interval t1, wherein:
   when the data-altering serial number in the request packet is not consistent with the data-altering serial number locally stored on the server, the server releases the increased amount key-value data and the latest increased-amount pulling time-stamp to the client;
   when the data-altering serial number in the request packet is consistent with the data-altering serial number locally stored on the server, the server compares the increased-amount pulling time-stamp in the request packet with the current-time to obtain a time interval between the increased-amount pulling time-stamp in the request packet and the current-time;
   when the time interval between the increased-amount pulling time-stamp and the current-time is greater than or equal to a pre-set increased amount time interval t2 between two adjacent full-amount pullings, the server releases the increased amount key-value data and the latest increased-amount pulling time-stamp to the client; and when the time interval between the increased-amount pulling time-stamp and the current-time is less than a pre-set increased time interval t2 between two adjacent full-amount pullings, the server does not releases the key-value data to the client.

3. The method according to claim 2, wherein the increased amount key-value data contain key-value data modified or added since a last pulling, and a key of the key-value data deleted since the last pulling.

4. The method according to claim 1, wherein the request packet further contains a two-dimension checksum parameter, the method further including:

simultaneously releasing, by the server, the two-dimension checksum parameter calculated according to the full amount key-value data, when the server releases the full amount key-value data to the client; and simultaneously releasing, by the server, the two-dimension checksum parameter calculated according to the full amount key-value data, when the server releases the increased account key-value data to the client.

5. The method according to of claim 4, further including determining, by the server, the key-value data modified or added since the last pulling, including:

dividing the full amount key-value data of the server into a number M sets according to a hash(key)%M, each set being calculated to provide one checksum to obtain M checksums;

dividing the full amount key-value data of the server into a number N sets according to a hash(key)%N, each set being calculated to provide one checksum to obtain N checksums, wherein the M checksums and the N checksums form the two-dimension checksum parameter of the server, and the M is not equal to the N; and comparing the two-dimension checksum parameter in the request packet sent from the client with the two-dimension checksum parameter calculated by the server, to determine the modified or added key-value data.

6. The method according to claim 4, further including:

determining, by the server, the key of the key-value data deleted since the last pulling including:

caching a corresponding key and caching a deletion time-stamp, when a key-value data is deleted;

deleting the corresponding key, when the time interval between the deletion time-stamp and the current-time is greater than the pre-set full-amount pulling time interval t1; and returning all of keys that are cached after a last pulling time-stamp to the client, when the key of the key-value data deleted since the last pulling needs to be returned, wherein the last pulling time-stamp is a latest one between the full-amount pulling time-stamp and the increased-amount pulling time-stamp contained in the request packet.

7. The method according to claim 3, further including determining, by the server, the key-value data modified or added since the last pulling, including:

adding, by the server, a time-stamp into each record of the key-value data;

updating the time-stamp as the current-time, when adding or modifying a record of the key-value data; and when the client pulls data, determining all of the key-value data after the time-stamp of the last pulling data contained in the request packet from the client to be recorded as the modified or added key-value data.

8. A server for releasing instant messaging key-value data, comprising:

at least one processor, a memory storing instructions, wherein when being executed, the instructions cause the at least one processor to:

receive a request packet for pulling key-value data sent from a client during a login, wherein the request packet at least contains a full-amount pulling time-stamp, an increased-amount pulling time-stamp, and a data-altering serial number; and select a pre-set data releasing mechanism according to parameters contained in the request packet, to release full amount key-value data to the client or to release increased amount key-value data to the client, or not to release the key-value data, such that, according to a returned result from the server, the client updates local cache data and displays to a user;

wherein the instructions further cause the at least one processor to:

determine whether a configuration of the full-amount pulling time-stamp, the increased-amount pulling time-stamp, and the data-altering serial number contained in the request packet is empty;

release the full amount key-value data and a latest full-amount pulling time-stamp to the client, when the configuration of the full-amount pulling time-stamp, the increased-amount pulling time-stamp and the data-altering serial number contained in the request packet is empty;

compare the full-amount pulling time-stamp in the request packet with a current-time to obtain a time interval between the full-amount pulling time-stamp in the request packet and the current-time, when the configuration is not empty; and release the full amount key-value data and the latest full-amount pulling time-stamp to the client by the server, when the time interval between the full-amount pulling time-stamp and the current-time is greater than or equal to a pre-set full-amount pulling time interval t1.

9. The server according to claim 8, wherein the instructions further cause the at least one processor:

to determine whether the data-altering serial number in the request packet is consistent with a data-altering serial number locally stored on the server, when the time interval between the full-amount pulling time-stamp and the current-time is less than a pre-set full-amount pulling time interval t1;

to release the increased amount key-value data and the latest increased-amount pulling time-stamp to the client by the server, when the data-altering serial number in the request packet is not consistent with the data-altering serial number locally stored on the server;

to compare the increased-amount pulling time-stamp in the request packet with the current-time, and obtain a time interval between the increased-amount pulling time-stamp in the request packet and the current-time, when the data-altering serial number in the request packet is consistent with the data-altering serial number locally stored on the server;

to release the increased amount key-value data and the latest increased-amount pulling time-stamp to the client, when the time interval between the increased-amount pulling time-stamp and the current-time is greater than or equal to a pre-set increased amount time interval t2 between two adjacent full-amount pullings; and not to release the key-value data to the client, when the time interval between the increased-amount pulling time-stamp and the current-time is less than a pre-set increased time interval t2 between two adjacent full-amount pullings.

10. The server according to claim 9, wherein the increased amount key-value data contain key-value data modified or added since a last pulling, and a key of the key-value data deleted since the last pulling.

11. The server according to claim 8, wherein the request packet further contains a two-dimension checksum parameter, and wherein the instructions further cause the at least one processor to simultaneously release the two-dimension checksum parameter calculated according to the full amount key-value data, when the server releases the full amount key-value data to the client; or to simultaneously release the two-dimension checksum parameter calculated according to the full amount key-value data, when the server releases the increased account key-value data to the client.

12. The server according to claim 11, wherein the instructions further cause the at least one processor:

to divide the full amount key-value data of the server into a number M sets according to a hash(key)%M, each set being calculated to provide one checksum to obtain M checksums; to divide the full amount key-value data of the server into a number N sets according to a hash (key)%N, each set being calculated to provide one checksum to obtain N checksums, wherein the M checksums and the N checksums form the two-dimension checksum parameter of the server, and the M is not equal to the N; and to compare the two-dimension checksum parameter in the request packet sent from the client with the two-dimension checksum parameter calculated by the server, and to determine the modified or added key-value data.

13. The server according to claim 11, wherein the instructions further cause the at least one processor:

to cache a corresponding key and a deletion time-stamp when a key-value data is deleted;

to delete the corresponding key, when the time interval between the deletion time-stamp and the current-time is greater than the pre-set full-amount pulling time interval t1; and to return all of the key cached after a last pulling time-stamp to the client, when the key of the key-value data deleted since the last pulling needs to be returned, wherein the last pulling time-stamp is a latest one of the full-amount pulling time-stamp and the increased-amount pulling time-stamp contained in the request packet.

14. The server according to claim 10, wherein the instructions further cause the at least one processor:

to add a time-stamp into each record of the key-value data;

to update the time-stamp as the current-time, when adding or modifying a record of the key-value data; and to determine all of the key-value data after the time-stamp of the last pulling data contained in the request packet from the client to be recorded as the modified or added key-value data when the client pulls data.

15. A method for releasing instant messaging key-value data, comprising:

sending a request packet for pulling a key-value data, wherein the request packet at least contains a full-amount pulling time-stamp, an increased-amount pulling time-stamp, and a data-altering serial number;

releasing full amount key-value data or increased amount key-value data, by a receiving server, according to parameters contained in the request packet; and updating local cache data according to a returned result from the receiving server;

wherein the step of releasing full amount key-value data or increased amount key-value data further comprises:

determining whether a configuration of the full-amount pulling time-stamp, the increased-amount pulling time-stamp, and the data-altering serial number contained in the request packet is empty;

releasing the full amount key-value data and a latest full-amount pulling time-stamp, when the configuration is determined empty;

comparing the full-amount pulling time-stamp in the request packet with a current-time to obtain a time interval between the full-amount pulling time-stamp in the request packet and the current-time, when the configuration is determined not empty; and releasing the full amount key-value data and the latest full-amount pulling time-stamp, when the time interval between the full-amount pulling time-stamp and the current-time is greater than or equal to a pre-set full-amount pulling time interval t1.

16. The method according to claim 15, wherein the step of updating local cache data according to the returned result from the receiving server includes:

covering the full amount key-value data, the data-altering serial number, the full-amount pulling time-stamp and the two-dimension checksum parameter in local cache, when the receiving server returns the full amount key-value data, the data-altering serial number, the full-amount pulling time-stamp and the two-dimension checksum parameter;

covering the data-altering serial number, the increased-amount pulling time-stamp and the two-dimension checksum parameter in local cache, when the increased amount key-value data, the data-altering serial number, the increased-amount pulling time-stamp, and the two-dimension checksum parameter are returned by the receiving server; and updating the local cache data according to the key of the increased amount key-value data.

* * * * *